(12) United States Patent
Park et al.

(10) Patent No.: US 9,917,993 B2
(45) Date of Patent: Mar. 13, 2018

(54) LENS MOUNTING MODULE, INTERCHANGEABLE LENS SYSTEM, AND ELECTRONIC APPARATUS HAVING THE SAME

(71) Applicant: SAMSUNG ELECTRONICS CO., LTD., Suwon-si, Gyeonggi-do (KR)

(72) Inventors: Sung-han Park, Suwon-si (KR); Sang-ki Min, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/548,768

(22) Filed: Nov. 20, 2014

(65) Prior Publication Data

US 2015/0181090 A1  Jun. 25, 2015

(30) Foreign Application Priority Data

Dec. 20, 2013 (KR) ........................ 10-2013-0160568

(51) Int. Cl.
| | |
|---|---|
| *H04N 5/225* | (2006.01) |
| *H04N 5/232* | (2006.01) |
| *G03B 17/14* | (2006.01) |
| *G02B 7/14* | (2006.01) |

(52) U.S. Cl.
CPC .......... *H04N 5/2254* (2013.01); *G03B 17/14* (2013.01); *H04N 5/23209* (2013.01); *G02B 7/14* (2013.01)

(58) Field of Classification Search
None
See application file for complete search history.

(56) References Cited

U.S. PATENT DOCUMENTS

| | | | |
|---|---|---|---|
| 2004/0041937 A1* | 3/2004 | Oshima ................ | H04N 5/2253 348/335 |
| 2005/0200743 A1* | 9/2005 | Kawai ...................... | G02B 7/14 348/360 |
| 2007/0189745 A1* | 8/2007 | Masuda ............. | H04N 5/23209 396/55 |
| 2009/0324213 A1* | 12/2009 | Wang ..................... | G02B 7/026 396/529 |
| 2010/0111517 A1* | 5/2010 | Yasuda .................. | G03B 17/00 396/532 |
| 2011/0007200 A1* | 1/2011 | Okuie ............... | H01L 27/14618 348/335 |

(Continued)

FOREIGN PATENT DOCUMENTS

| | | |
|---|---|---|
| JP | 2008-033044 A | 2/2008 |
| JP | 2010-049174 A | 3/2010 |

*Primary Examiner* — Roberto Velez
*Assistant Examiner* — Quan Pham
(74) *Attorney, Agent, or Firm* — Drinker Biddle & Reath LLP

(57) ABSTRACT

A lens mounting module includes an image pickup unit; a mount plate that includes an installation surface on which a lens unit is installed; a first support frame located between the image pickup unit and the mount plate, that supports the mount plate, and that includes a contact point that provides an electrical contact with the lens unit installed on the mount plate; and a second support frame installed between the first support frame and the image pickup unit, that supports the first support frame, and that includes an insertion part through which the image pickup unit is inserted.

12 Claims, 13 Drawing Sheets

(56) References Cited

U.S. PATENT DOCUMENTS

| | | | |
|---|---|---|---|
| 2012/0008043 A1* | 1/2012 | Yasuda | G03B 17/02 |
| | | | 348/374 |
| 2015/0049244 A1* | 2/2015 | Tokunaga | G03B 17/14 |
| | | | 348/375 |
| 2015/0070557 A1* | 3/2015 | Petty | H04N 5/2251 |
| | | | 348/333.01 |
| 2015/0104164 A1* | 4/2015 | Yasuda | G03B 17/14 |
| | | | 396/479 |

* cited by examiner

LENS MOUNTING MODULE, INTERCHANGEABLE LENS SYSTEM, AND ELECTRONIC APPARATUS HAVING THE SAME

RELATED APPLICATION

This application claims the priority benefit of Korean Patent Application No. 10-2013-0160568, filed on Dec. 20, 2013, in the Korean Intellectual Property Office, the disclosure of which is incorporated herein in its entirety by reference.

BACKGROUND

1. Field

One or more embodiments relate to a lens mounting module, an interchangeable lens system, and an electronic apparatus having the same, and more particularly, to the lens mounting module with an enhanced assembly performance, an interchangeable lens system, and electronic apparatus having the same.

2. Description of the Related Art

An electronic apparatus may include a photographing apparatus that is an apparatus that records a shape of an object by use of image pickup devices such as charge-coupled device (CCD) or complementary metal-oxide semiconductor (CMOS) devices which transform the light data coming through a lens to electrical signals, and includes digital cameras, digital camcorders, mobile phones, tablet computers, personal digital assistants, etc.

The photographing apparatus may include an interchangeable lens system in which a lens unit is separable from a body unit and a fixed lens system in which the lens unit is fixed to the body unit. The interchangeable lens system may include a lens mount apparatus in which various kinds of lens units may be installed to the body unit.

SUMMARY

The embodiments include a lens mounting module which may be easily assembled to a case of an electronic apparatus that includes an interchangeable lens system, and the electronic apparatus comprising such module.

The embodiments also include a lens mounting module which may decrease a flangeback distance, an interchangeable lens system, and an electronic apparatus comprising such module.

According to an embodiment, a lens mounting module includes an image pickup unit; a mount plate that includes an installation surface on which a lens unit is installed; a first support frame located between the image pickup unit and the mount plate, that supports the mount plate, and that includes a contact point that provides an electrical contact with the lens unit installed on the mount plate; and a second support frame installed between the first support frame and the image pickup unit, that supports the first support frame, and that includes an insertion part through which the image pickup unit is inserted.

A plurality of tilting control units may be installed in the insertion part, the plurality of tilting control units configured to control an angle of the image pickup unit against the second support frame.

The insertion part may be configured such that the back side of the tilting control unit is prevented from being exposed.

The insertion part may be configured such that the back side of the tilting control unit is prevented from being exposed in a direction perpendicular to that of a light axis.

The back side of the insertion part may be protruded further than that of the tilting control unit.

The back side of the insertion part may be protruded further than that of the image pickup unit.

The second support frame may include a plurality of joining units configured to join to a case of an electronic apparatus.

The case may include a front case and a rear case installed behind the front case, and the joining unit may be joined to the rear case.

The image pickup unit may include an electronic shutter.

The contact point may include a contact pin protruded from the first support frame toward an object and a plate spring that provides an elastic force to the contact pin.

The mount plate may include a fixing unit that fixes the lens unit in an integrated configuration.

The fixing unit may be configured in a protrusion shape in a direction crossing that of an optical axis of the lens unit.

The first support frame may include a through-hole that forms a light path, and an inclined surface formed on the perimeter of the through-hole with an inclination against the direction of an optical axis of the lens unit.

A plate spring may be installed between the mount plate and the first support frame.

According to another embodiment, an electronic apparatus includes: a lens unit; a case having an opening port; and a lens mounting module, as described above, located inside the case and installed such that the lens unit may be mounted and dismounted.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
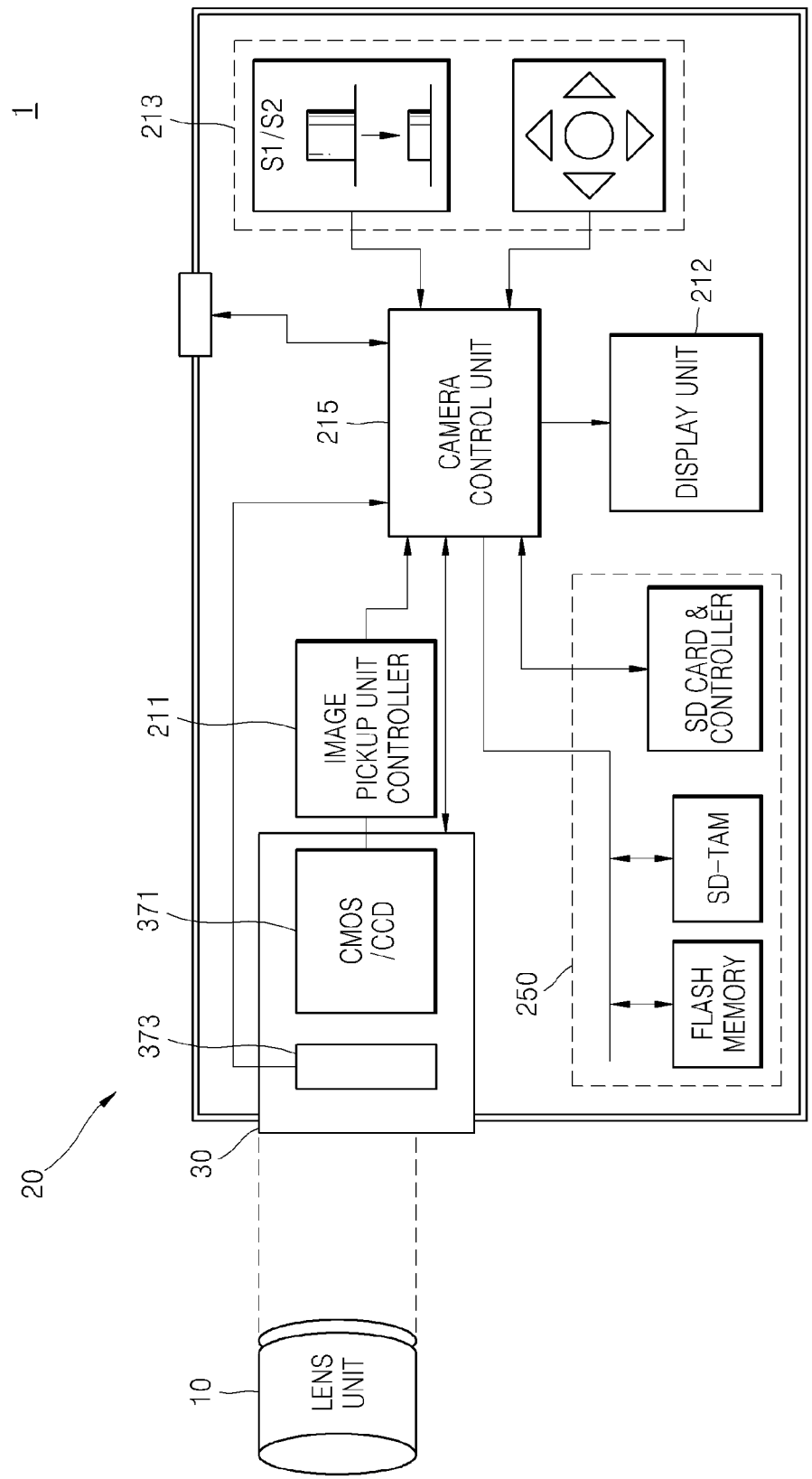
FIG. 1 is a block diagram illustrating a configuration of an electronic apparatus including an interchangeable lens system, according to an embodiment.

Reference will now be made in detail to embodiments, examples of which are illustrated in the accompanying drawings, wherein like reference numerals refer to the like elements throughout.

Figure 2:
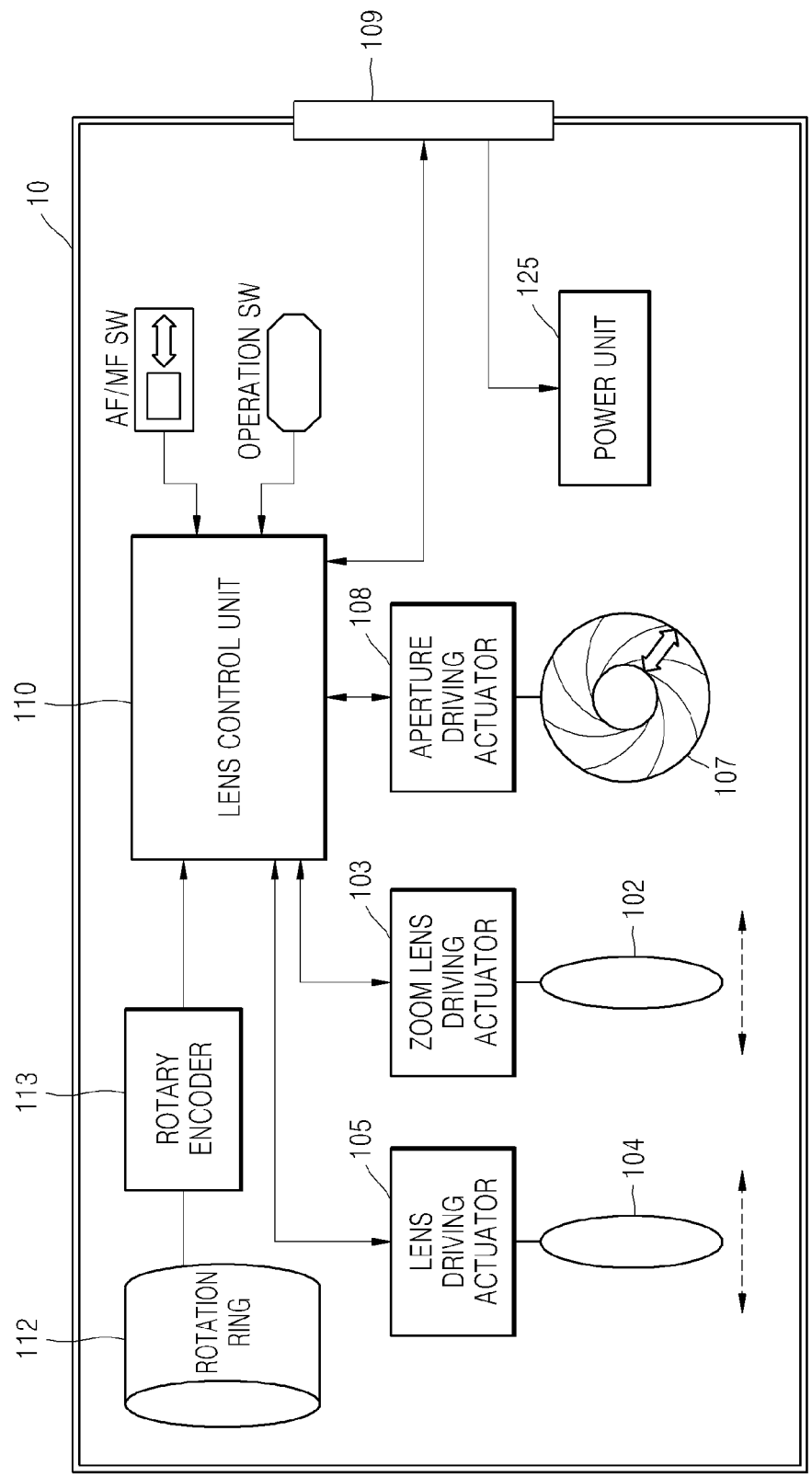
FIG. 2 is a block diagram illustrating a configuration of a lens unit in FIG. 1, according to an embodiment.

FIG. 1 is a block diagram illustrating a configuration of an electronic apparatus 1 including an interchangeable lens system, according to an embodiment. FIG. 2 is a block diagram illustrating a configuration of a lens unit 10 in FIG. 1, according to an embodiment.

Referring to FIGS. 1 and 2, the electronic apparatus 1 includes a lens unit 10 and a body unit 20, according to an embodiment.

The body unit 20 may have a function of focus detection, and the lens unit 10 may have a function to drive a focus lens 104 of the lens unit 10. In case of manual focus control, a zoom lens 102 and the focus lens 104 may be driven by an operation of a user.

The lens unit 10 may include the zoom lens 102 for zoom control, the focus lens 104 to change focus locations, an aperture 107, a lens driving actuator 105, a rotary encoder 113, an aperture driving actuator 108, a lens control unit 110, and a lens mount 109. The zoom lens 102 and the focus lens 104 may be configured by a group of lenses composed of a plurality of lenses. An operation switch (OPERATION SW) and an autofocus/manual focus switch (AF/MF SW) of the lens unit 10 may be communicatively coupled with the lens control unit 110.

In an automatic focus control method, the lens driving actuator 105 and the aperture driving actuator 108 are controlled by the lens control unit 110, and drive the focus lens 104 and the aperture 107, respectively. For example, the lens driving actuator 105 may drive the focus lens 104 to be moved in the direction of an optical axis. Also, a zoom lens driving actuator 103 may drive the zoom lens 102 to be moved in the direction of the optical axis.

On the other hand, the focus lens 104 may be controlled by a manual operation of the user. The rotary encoder 113 may detect the location of the focus lens 104 driven by the manual operation of the user. For example, the user may manually operate a rotation ring 112 to move the location of the focus lens 104, and the rotary encoder 113 may detect the rotation status of the rotation ring 112 to calculate the location of the focus lens 104. The configuration of changing the location of the focus lens 104 by use of the rotation ring 112 should be understood by those of ordinary skill in the art, as well as that various changes in form and details may be made therein, thus detailed explanations are omitted.

Next, when the lens control unit 110 calculates the location of the focus lens 104, the lens control unit 110 transmits the calculated location information of the focus lens 104 to the body unit 20. When the location of the focus lens 104 is changed or there is a request by a camera control unit 215 for the location information of the focus lens 104, the lens control unit 110 may send the calculated location information of the focus lens 104 to the body unit 20. Also, the lens control unit 110, in the manual focus control method, may continuously calculate and send information of rotation status of the lens unit 10 to the body unit 20.

A power unit 125 may provide the power received from the body unit 20 to the lens control unit 110 and actuators 103, 105, 108. The body unit 20 may also include additional components 250 communicatively coupled with the camera control unit 215. The additional components 250 may include flash memory, SD-TAM, and an SD card and controller.

In embodiments described above, the control of the lens unit 10 is explained as being executed by the lens control unit 110; however, the configuration is not limited to the descriptions set forth herein, and that the control of the lens unit 10 may be executed by the camera control unit 215 as described below or that the lens control unit 110 and the camera control unit 215 may be configured as a single control unit should be understood by those of ordinary skill in the art, as well as that various changes in form and details may be made therein.

The lens mount 109 has contact points (not illustrated) which are interlocked with contact points 332 of a first support frame 330 in FIG. 5A to be described below and is used as a passage for transceiving power, data, control signals, etc.

The body unit 20 may include a lens mounting module 30, an image pickup unit controller 211, a display unit 212, an operation key 213, and the camera control unit 215.

The lens mounting module 30 is configured for the lens unit 10 to be installed and makes an electrical contact with contact points (not illustrated) of the lens unit 10. The lens mounting module 30 may include an image sensor 371 and an electronic shutter 373.

The image sensor 371 picks up an image from the light which passes through an image optical system of the lens unit 10 and generates image signals. The image sensor 371 may include a plurality of photoelectric transducers arranged in a matrix shape, or a vertical and/or horizontal transmission passage where the image signals begin to be read by moving electrons in the photoelectric transducer, etc. A charge coupled device (CCD), or a complementary metal oxide semiconductor (CMOS) device, etc. may be used for the image sensor 371.

The size of the image sensor 371 may be equal to or less than 1 inch. When the image sensor 371 has a rectangular shape, the size of the image sensor 371 may be defined as a diagonal length, and when a circular shape, it may be defined as a diameter.

The electronic shutter 373 determines the time when the light is allowed to pass through to the image sensor 371, that is, the exposure time. Examples of the electronic shutter 373 may include a global shutter and a rolling shutter.

The image pickup unit controller 211 generates a timing signal, and controls such that the image sensor 371 may pick up an image in synchronization with the timing signal. Also, the image pickup unit controller 211 controls such that image signals in the horizontal direction may be sequentially read out after the charge accumulation is complete at each scanning line, and the readout horizontal direction image signals are utilized for focus detection in the camera control unit 215.

The display unit 212 displays various images and information. The display unit 212 may use organic light emitting diode (OLED), conventional liquid crystal display (LCD), etc. A touch panel may be equipped on the surface cover so that the touch location may be input while looking at images.

The operation key 213 is an area where various commands are input from the user to operate the electronic apparatus 1. The operation key 213 may include various buttons such as a shutter-release button, a main switch button, a mode dial, a menu button, etc.

The camera control unit 215 performs focus detection to image signals generated by the image sensor 371 and calculates focus detection values. Also, the camera control unit 215 preserves the focus detection values at the time of focus detection according to the timing signal generated in the image pickup unit controller 211.

The lens mounting module 30 may transmit the calculated focus location values to the lens unit 10 via contact points 332 which are electrically in contact with contact points (not illustrated) of the lens unit 10.

Figure 3A:
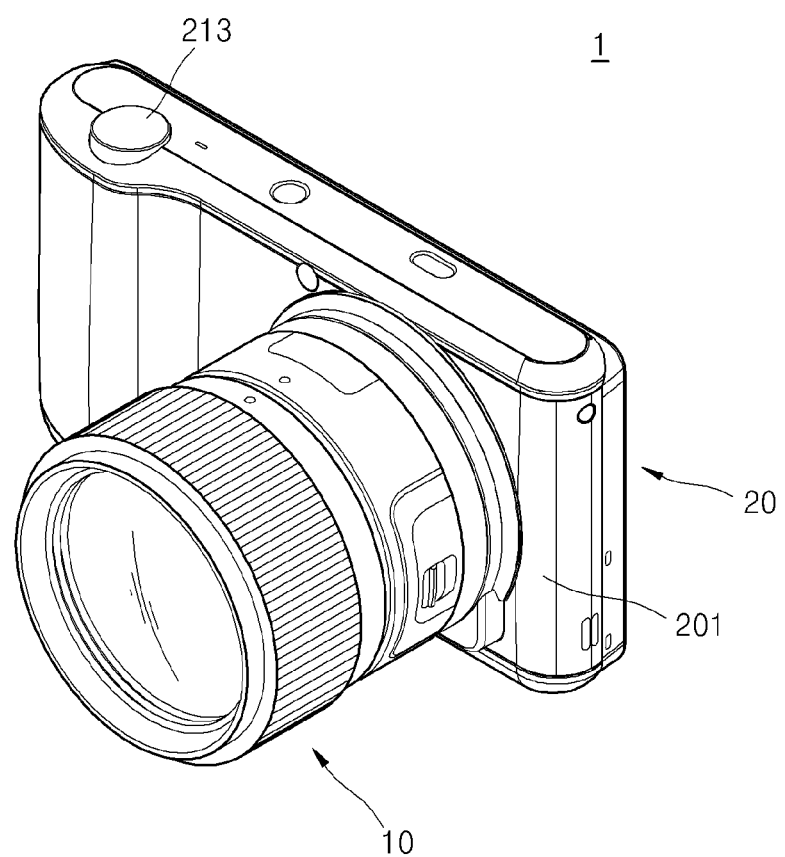
FIGS. 3A and 3B are perspective views of the electronic apparatus of FIG. 1, according to an embodiment.
Figure 3B:
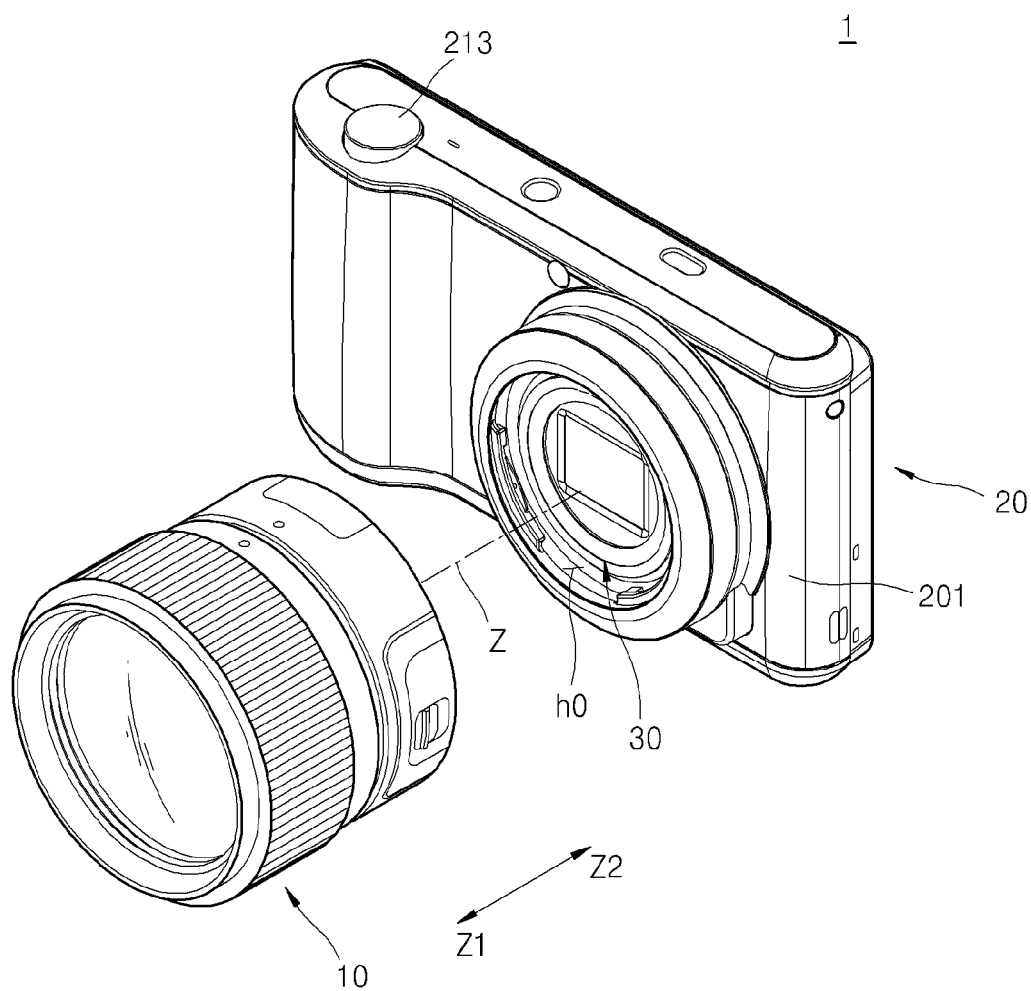

FIGS. 3A and 3B are perspective views of the electronic apparatus 1 of FIG. 1, according to an embodiment. FIG. 3A illustrates a state that the lens unit 10 is assembled to the body unit 20, and FIG. 3B illustrates a state that the lens unit 10 is disassembled from the body unit 20.

The lens unit 10 may include components, not illustrated but described in FIG. 2, such as the zoom lens 102 for zoom control, the focus lens 104 and the aperture 107 for changing focus location, the lens driving actuator 105, the rotary encoder 113, the aperture driving actuator 108, the lens control unit 110, and the lens mount 109.

The body unit 20 includes a case 201 and the lens mounting module 30. The case 201 forms the outer shape of the electronic apparatus 1. The body unit 20 also includes an operation key 213 which is the area to receive various commands from the user. The display unit 212 (not illustrated in FIGS. 3A and 3B), which displays various images and information may be allocated at an outer surface of the case 201. In the case 201, an opening port h0 is formed which corresponds to the lens mounting module 30, and through the opening port h0 the lens unit 10 may be installed to the lens mounting module 30.

The user inserts one end of the lens unit 10 into the opening port h0 with the one end facing toward the lens mounting module 30 and rotates it in a certain direction, for example, in a clockwise direction to fix the lens unit 10 to the lens mounting module 30 and to install it to the body unit 20. In this case contact points (not illustrated) formed on the lens unit 10 and the contact points 332, shown in FIG. 5A, formed on the lens mounting module 30 contact each other, and power, data, control signal, etc. may be transceived between the lens unit 10 and the body unit 20.

Figure 4:
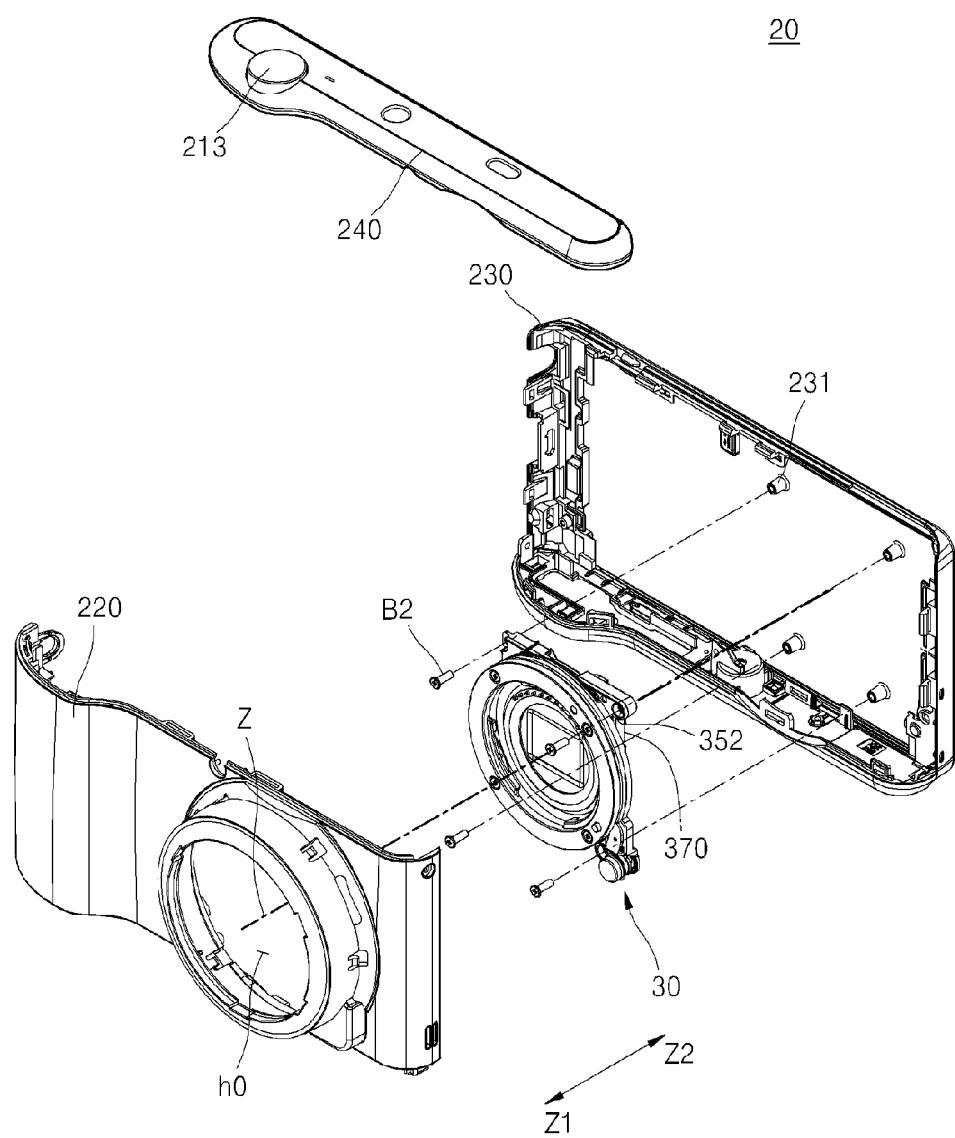
FIG. 4 is an exploded perspective view of a body unit in FIG. 3A, according to an embodiment.

FIG. 4 is an exploded perspective view of the body unit 20 in FIG. 3A, according to an embodiment. FIGS. 5A and 5B are exploded perspective views of the lens mounting module 30 in FIG. 4, according to an embodiment.

Referring to FIG. 4, the body unit 20 includes the case 201 and the lens mounting module 30. The case 201 includes a front case 220 toward an object (not illustrated), a rear case 230 disposed behind the front case 220, and an upper case 240 which combines with upper surfaces of the front case 220 and the rear case 230. The lens mounting module 30 is located between the front case 220 and the rear case 230. A front direction Z1 is defined as a direction toward an object (not illustrated), or the lens unit 10 along the optical axis Z of the lens unit 10, and the rear direction Z2 is defined as an opposite direction to the front direction Z1. The optical axis Z includes both the front direction Z1 and the rear direction Z2.

The opening port h0 is formed in the front case 220 to connect with the lens unit 10 in FIG. 3A. A plurality of support units 231 are formed to firmly fix the lens mounting module 30 on the inner surface of the rear case 230. An operation key 213 may be formed in the upper case 240. The display unit 212 (illustrated in FIG. 2) may be allocated on the outer surface of the rear case 230. The inner surface is defined as a surface which is not exposed when the body unit 20 is completely assembled, and the outer surface is defined as a surface which is exposed to the outside when the body unit 20 is completely assembled.

Figure 5A:
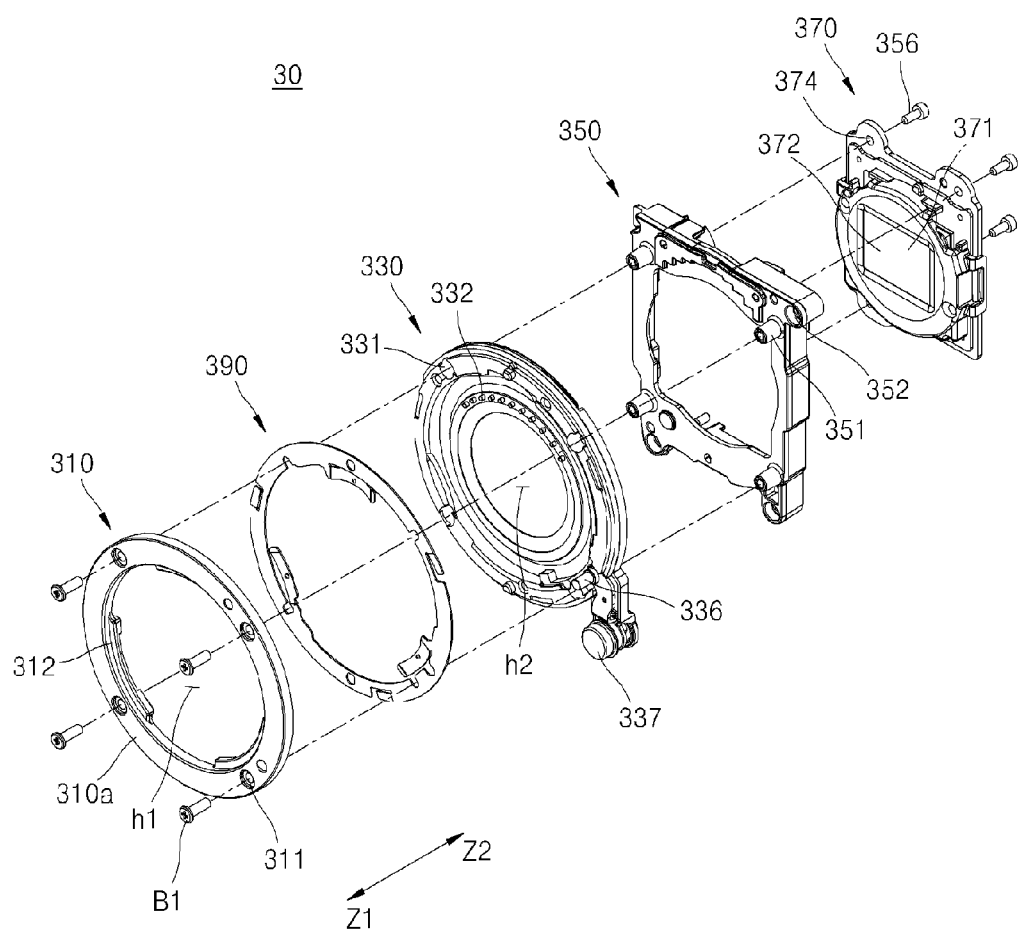
FIGS. 5A and 5B are exploded perspective views of a lens mounting module in FIG. 4, according to an embodiment.
Figure 5B:
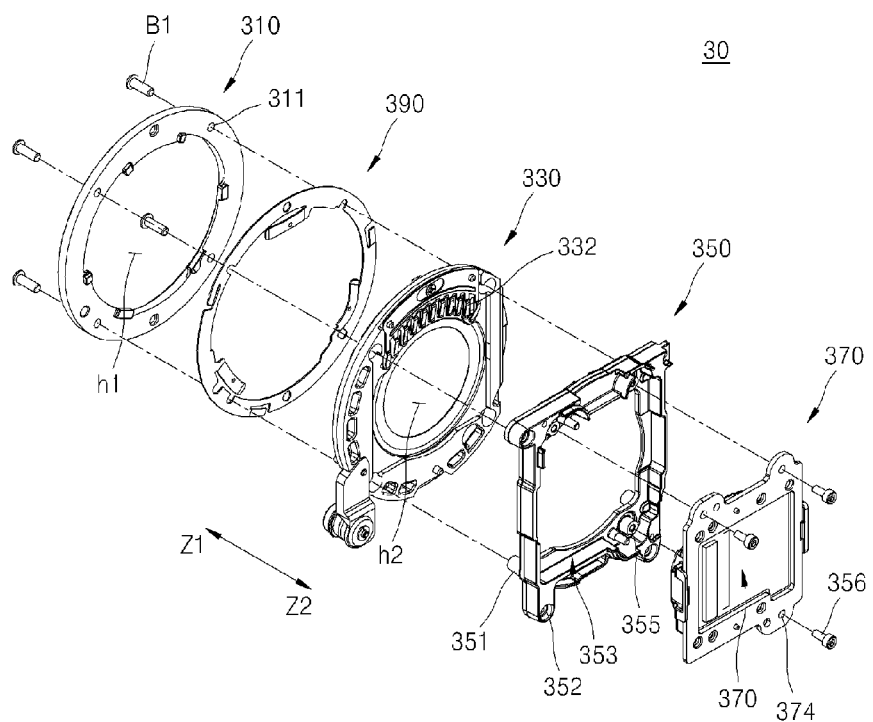

Referring to FIGS. 5A and 5B, the lens mounting module 30 includes a mount plate 310, a plate spring 390, the first support frame 330, a second support frame 350, and an image pickup unit 370.

The mount plate 310 provides a first opening port h1 for the light to pass through, and a plurality of first combination holes 311 are formed around the first opening port h1 to combine with the first support frame 330. The mount plate 310 provides an installation surface 310a where the lens unit 10 is installed. When the lens unit 10 is installed to the lens mounting module 30, the installation surface 310a of the mount plate 310 contacts and supports the lens unit 10. The distance between the installation surface 310a of the mounting plate 310 and the image sensor 371, that is, the flangeback, may be established as a specific distance. The flangeback may be differently determined depending on the size of the image sensor 371, characteristics of the lens unit 10, etc. For example, when a size of the image sensor 371 is equal to or less than 1 inch, the flangeback may be equal to or less than 7.4 mm.

The mount plate 310 includes a plurality of fixing units 312 that fix the lens unit 10. The fixing unit 312 may be formed as an integral part on the mount plate 310. When the fixing unit 312 is formed not as an integral part on the mount plate 310 but as a separate component, an additional process of assembling the fixing unit 312 to the mount plate may be necessary. Such assembly process may become more difficult because the width of the fixing unit 312 in the direction of the optical axis Z becomes smaller due to the demand for miniaturization of the flangeback. However, according to an embodiment, the fixing unit 312 is formed as an integral part to the mount plate 310 and thus, an additional assembly process is not necessary to assemble the fixing unit 312 to the mount plate 310, and therefore, the assembly performance of the lens mounting module 30 may be enhanced.

A plurality of fixing units 312 may be separately arranged from each other along the perimeter direction of the first opening port h1. The fixing unit 312 may be formed in protrusion in a direction crossing the optical axis Z. The lens unit 10 may be installed to the lens mounting module 30 by inserting the end part of the lens unit 10 between the fixing units 312 and rotating.

The plate spring 390 is located in a rear direction Z2 of the mount plate 310, and carries a role of pressing the end of the inserted lens unit 10 in the direction of the fixing unit 312. The lens unit 10 may be stably installed to the lens mounting module 30 through the plate spring 390.

The first support frame 330 is located between the mount plate 310 and the image pickup unit 370, and located in the rear direction Z2 of the mount plate 310 and the plate spring 390. The first support frame 330 supports the mount plate 310 and the plate spring 390 with a first fastening member B1. For this purpose, a second combination hole 331, which the first fastening member B1 passes through, is provided in the first support frame 330. The first fastening member B1 is a member for fastening, and may include a bolt, a screw, etc.

The first support frame 330 provides a second opening port h2 for the light to pass through, and the contact point 332 is prepared on the perimeter of the second opening port h2 to provide an electrical contact with contact points (not illustrated) formed on the lens unit 10. The contact point 332 of the first support frame 330 is protruded in the front direction Z1 along the optical axis Z, and may be moved to the rear direction Z2 due to the compression by the lens unit 10 when assembled to the lens mounting module 30.

Figure 6:
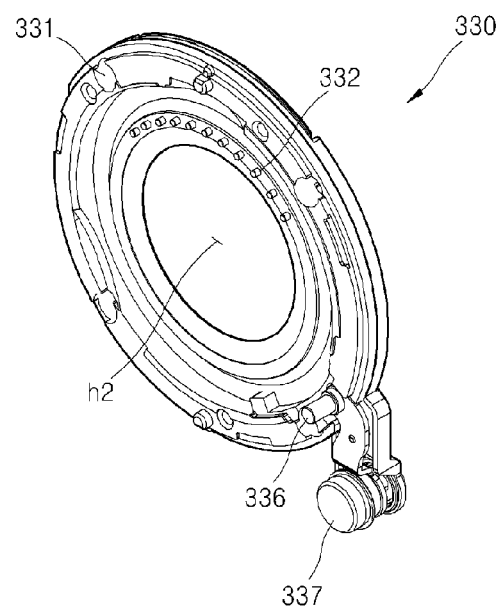
FIG. 6 illustrates a first support frame in FIG. 5A, according to an embodiment.
Figure 7:
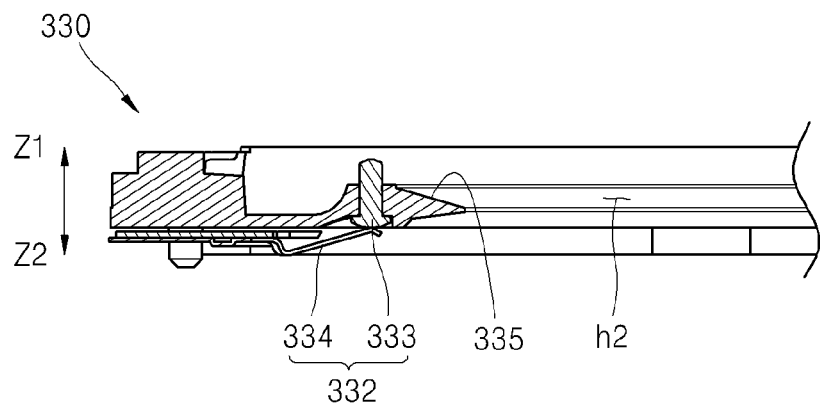
FIG. 7 is a cross-section of a portion of the first support frame in FIG. 6, according to an embodiment.

FIG. 6 illustrates the first support frame 330 in FIG. 5A, according to an embodiment. FIG. 7 is a cross-section of a portion of the first support frame 330 in FIG. 6, according to an embodiment. Referring to FIGS. 6 and 7, the first support frame 330 provides the contact point 332 formed in protrusion in the front direction Z1 along the optical axis Z. The contact point 332 includes a contact pin 333, and a leaf spring 334 that provides elastic force to the contact pin 333 in the front direction Z1. According to an embodiment, a space for the contact point 332 may be minimized by adopting the leaf spring 334 as a plate spring, not a coil spring, to apply force to the contact pin 333. The reason is that the height occupied by the leaf spring 334 formed by several plates with different lengths is smaller than that of the coil spring wound in a circular shape. In this method, the flangeback of the lens mounting module 30 may be made smaller. The contact pin 333 may be connected to a printed circuit board (PCB) (not illustrated) to be connected to the image pickup unit controller 211 of the body unit 20. The contact pin 333 may include conductive material or metal such as copper, etc.

An inclined surface 335, formed with an inclination against the direction of the optical axis Z, may be included in the perimeter of the second opening port h2 of the first support frame 330. The inclined surface 335 may prevent irregular reflection transmitted to the image pickup unit 370.

Referring to FIGS. 5A and 5B again, a rotation prevention bump 336 may be provided in the first support frame 330. The rotation prevention bump 336 has a configuration for either the front direction Z1 or the rear direction Z2, and performs a function of preventing rotation of the lens unit 10 when the lens unit 10 is installed to the lens mounting module 30. The rotation prevention bump 336 is interlocked with a release button 337. Accordingly, when the release button 337 is pressed, the rotation prevention bump 336 moves to the rear direction Z2, and the lens unit 10 may rotate. At such state, the lens unit 10 may be disassembled from the lens mounting module 30 by rotating the lens unit 10.

The second support frame 350 is located between the first support frame 330 and the image pickup unit 370. The second support frame 350 supports the first support frame 330. For this purpose, the second support frame 350 may provide a plurality of first combination units 351. The first combination unit 351 may have a protruded configuration toward the first support frame 330. The first combination unit 351 is inserted into the second combination hole 331 of the first support frame 330, and combined with the first fastening member B1 which passes through a first combination hole 311 of the mount plate 310.

The second support frame 350 may provide a plurality of second combination units 352. The second combination unit 352 may be combined with the case 201 of the electronic apparatus 1. The second combination unit 352 is located outside the first combination unit 351 so that the assembled lens mounting module 30 may be combined with the case 201 after the lens mounting module 30 is assembled.

The image pickup unit 370 is located in the rear direction Z2 of the second support frame 350, and supported by the second support frame 350. The image pickup unit 370 may include the image sensor 371, an optical low pass filter (OLPF) 372 located in front of the image sensor 371, and the electronic shutter 373 in FIG.

The image sensor 371 may be a photoelectric conversion device. Examples of the photoelectric conversion device may include a charge coupled device (CCD) or a complementary metal oxide semiconductor (CMOS) device.

The optical low pass filter 372 is located in the front direction Z1 of the image sensor 371, and performs a function of preventing damage to the image sensor 371 and alleviating the Moiré's phenomenon. However, the optical low pass filter 372 is not necessarily included in the image pickup unit 370 and may be omitted when necessary.

According to an embodiment, the electronic shutter 373 is included in the image pickup unit 370 instead of using a mechanical shutter between the second support frame 350 and the image pickup unit 370. The electronic shutter 373 in FIG. 1 electrically blocks the light entering the image sensor 371. Since the electronic shutter 373 is not configured to block the light entering the image sensor 371 by use of either physical or mechanical movement, the flangeback of the lens mounting module 30 may be minimized, when compared with a case of using a mechanical shutter. A global shutter or a rolling shutter may be used for the electronic shutter 373. A global shutter and a rolling shutter are well understood by one having ordinary skill in the art, so a detailed description is omitted.

The image pickup unit 370 provides a plurality of third combination holes 374. The plurality of third combination holes 374 are formed at locations corresponding to tilting control holes 355 formed on the second support frame 350. A plurality of tilting control members 356 are fastened to tilting control holes 355 after passing through third combination holes 374 of the image pickup unit 370. The angle of the image pickup unit 370 against the second support frame 350 may be adjusted by rotating the tilting control member 356. In this method, the tilting angle in the direction of the optical axis Z of the image pickup unit 370 against the mount plate 310, where the lens unit 10 is assembled, may be controlled.

Figure 8:
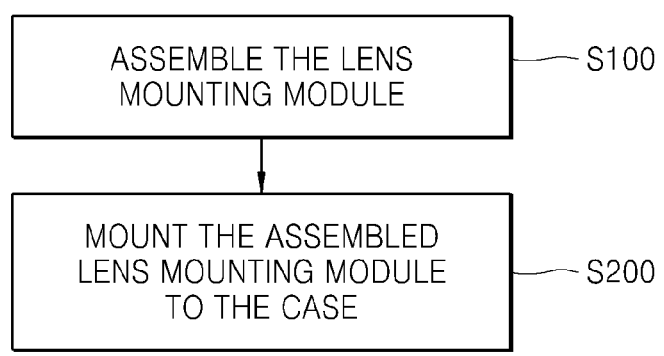
FIG. 8 is a block diagram illustrating a process of assembling the lens mounting module to a case, according to an embodiment.

The lens mounting module 30 is a module or a set where the plate 310, the plate spring 390, the first support frame 330, the second support frame 350, and the image pickup unit 370 are assembled as described above. FIG. 8 is a block diagram illustrating a process of assembling the lens mounting module 30 to a case 201, according to an embodiment. Referring to FIG. 8, after the lens mounting module 30 is assembled as a module (S100), the lens mounting module 30 which is assembled is mounted to the case 201 (S200). The productivity of the electronic apparatus 1 may be enhanced by performing an assembly process of the lens mounting module 30 including tilting control of the image pickup unit 370, and a mounting process of the lens mounting module 30 to the case 201, as independent processes. Before the assembly of the lens mounting module 30 is complete, the lens mounting module 30 is not mounted to the front case 220 or the rear case 230.

Figure 9A:
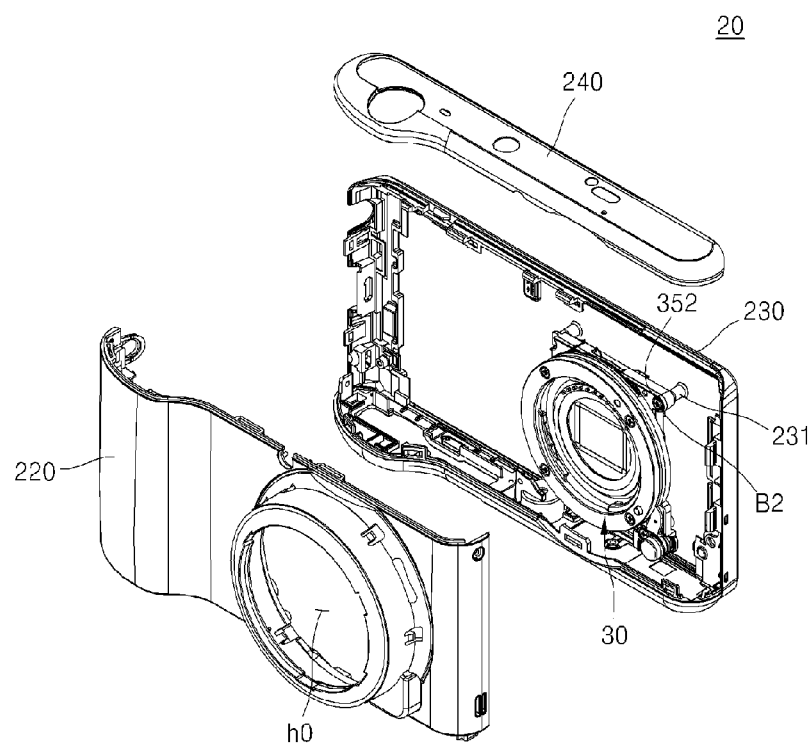
FIGS. 9A and 9B briefly illustrate a process of assembling the lens mounting module to the case 201, according to an embodiment.
Figure 9B:
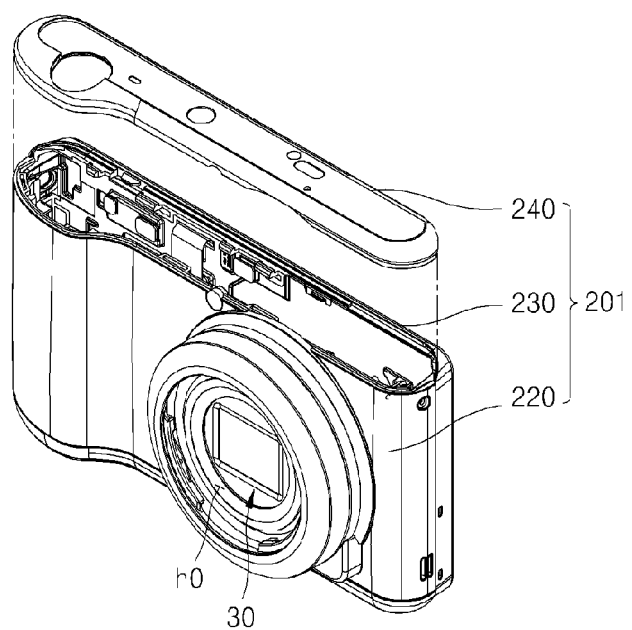

FIGS. 9A and 9B briefly illustrate a process of assembling the lens mounting module 30 to the case 201, according to an embodiment. The assembly process of the body unit 20 is described, referring to FIGS. 4, 9A and 9B.

Referring to FIGS. 4 and 9A, the lens mounting module 30 which is assembled as a module is combined with the rear case 230. A second fastening member B2 is combined with the second combination unit 352 of the lens mounting module 30 and with the support unit 231 of the rear case 230. The second fastening member B2 is a member for fastening, and may include a bolt, a screw, etc. The image pickup unit 370 in FIG. 5A included in the lens mounting module 30 is at a state of completion of tilting control, before the lens mounting module 30 is assembled to the case 201. In this method, the unnecessary tilting control process of the image pickup unit 370 may be omitted in processes of mounting the lens mounting module 30 to the case 201, and assembling the front case 220, the rear case 230, and the upper case 240.

Referring to FIG. 9B, the front case 220 is assembled to the rear case 230 which is combined with the lens mounting module 30. Then, assembling the front case 220 and the rear case 230, which are assembled, to the upper case 240 may complete the assembly of the body unit 20.

According to an embodiment, the electronic apparatus 1 has a structure such that the lens mounting module 30 which completes assembling as a module is mounted to the case 201, and each component of the lens mounting module 30 such as the first support frame 330 and the second support frame 350 are not individually assembled to either the front case 220 or the rear case 230. In this method, an inconvenience of individual assembling of the front support frame 330 or the second support frame 350 to the case 201 may be eliminated, and the productivity of the electronic apparatus 1 may be enhanced.

In case the structure is configured is such that after either the first support frame 330 or the second support frame 350 is individually assembled to the front case 220, the image pickup unit 370 is assembled to the second support frame 350, which is contrary to an embodiment described herein, then, the tilting control of the image pickup unit 370 may be changed in the assembly process of other components which are located inside the case 201. Thus, an inconvenience of performing again the tilting control process of the image pickup unit 370 may occur. Also, when the image pickup unit 370 is assembled after other components are assembled, an inconvenience of disassembling the image pickup unit 370 in the repair process of the electronic apparatus 1, and thus, an inconvenience of performing again the tilting control process of the image pickup unit 370 may occur.

However, according to an embodiment, the lens mounting module 30 is a module independent of other components, and thus, the lens mounting module 30 does not need to be disassembled in the assembly or repair processes of other components. In this method, since the tilting control of the image pickup unit 370 of the lens mounting module 30 is not changed, the unnecessary tilting control process may be omitted as described above. Also, even when the lens mounting module 30 may be disassembled from the rear case 230, no concern may occur about a change in tilting control of the image pickup unit 370.

Figure 10:
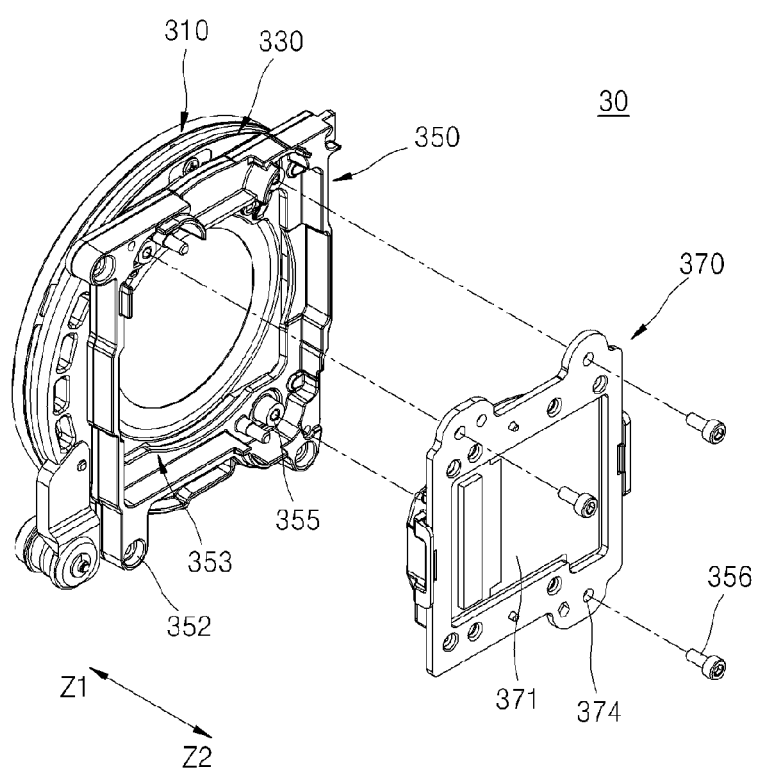
FIG. 10 illustrates a process of assembling a image pickup unit to the lens mounting module in FIG. 5B, according to an embodiment.

FIG. 10 illustrates a process of assembling the image pickup unit 370 to the lens mounting module 30 in FIG. 5B, according to an embodiment. Referring to FIG. 10, an insertion part 353 is formed on the second support frame 350. A tilting control unit may be provided in the insertion part 353 to control the angle of the optical axis Z direction of the image pickup unit 370. The tilting control unit includes the tilting control hole 355 and the tilting control member 356.

The image pickup unit 370 is inserted into the insertion part 353 where the tilting control hole 355 is prepared. A third combination hole 374 of the image pickup unit 370 is arranged such that the third combination hole 374 corresponds to the tilting control hole 355 formed on the insertion part 353. The tilting control member 356 passes through the third combination hole 374 and is clamped to the tilting control hole 355. The angle of the optical axis Z direction of the image pickup unit 370 against the second support frame 350 may be controlled by rotating a plurality of tilting control members 356. In this method, the angle of the optical axis Z direction of the image pickup unit 370 may be controlled against the installation surface 310a of the mount plate 310 where the lens unit 10 is installed.

Figure 11:
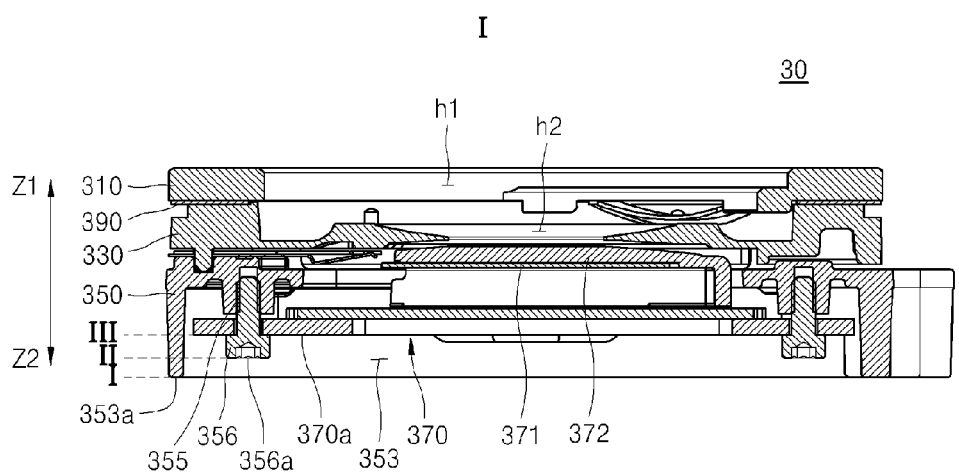
FIG. 11 is a cross-sectional view illustrating a state of the lens mounting module after the assembly is complete, according to an embodiment.

FIG. 11 a cross-sectional view illustrating a state of the lens mounting module 30 after the assembly is complete, according to an embodiment. Referring to FIG. 11, the image pickup unit 370 of the lens mounting module 30 which completes the assembly is inserted into the insertion part 353 of the second support frame 350, and at this state, the angle control in the optical axis Z direction, that is, the tilting control is complete against the mount plate 310.

The insertion part 353 may be configured such that a back side 356a of the tilting control member 356 after tilting control is completed is prevented from being exposed in a direction perpendicular to the optical axis Z. For example, a back side 353a of the insertion part 353 may be protruded further than the back side 356a of the tilting control member 356 in the rear direction Z2 along the optical axis Z. Also, the back side 353a of the insertion part 353 may be protruded further than a back side 370a of the image pickup unit 370 in the rear direction Z2 along the optical axis Z. The reference code I is a line extended from the back side 353a of the insertion part 353, the reference code II is a line extended from the back side 356a of the tilting control member 356, and the reference code III is a line extended from the back side 370a of the image pickup unit 370.

The back side 370a of the image pickup unit 370 and the back side 356a of the tilting control unit 356 may be prevented from being exposed to a direction perpendicular to optical axis Z, with the blocking of the back side 353a of the insertion part 353 protruded in the rear direction Z2 along the optical axis Z.

The lens mounting module 30 is assembled to the rear case 230 at a state where the lens mounting module 30 is arranged such that the image pickup unit 370 is facing the rear case 230. Since the second combination unit 352 protruded outside is combined with the support unit 231 of the rear case 230 while the image pickup unit 370 and the tilting control unit are inserted into the insertion part 353, the change in tilting control of the image pickup unit 370 may be prevented in the assembly process of the lens mounting module 30.

Also, since the lens mounting module 30 is assembled to the rear case 230 in a state where the image pickup unit 370 is facing the rear case 230, an approach toward the image pickup unit 370 from the outside may be limited when the assembly is complete. Accordingly, a change in tilting control of the image pickup unit 370 may be prevented, and even assembly processes of other components are performed to the rear case 230 after the lens mounting module 30 is assembled to the rear case 230. This applies to the repair process. For example, when a repair is intended for other components instead of the lens mounting module 30, there is no need to disassemble the lens mounting module 30, and thus, the possibility of changed tilting control of the image pickup unit 370 may be very low. Accordingly, an unnecessary tilting control of the image pickup unit 370 during a repair process may be minimized.

As described above, one or more embodiments include a lens mounting module which may be easily installed to a case of an interchangeable lens system included in an electronic apparatus and the electronic apparatus having the same.

One or more embodiments also include a lens mounting module which may reduce a flange-back distance and the interchangeable lens system and electronic apparatus having the same.

In embodiments described above, a case where the lens mounting module 30 is assembled to the rear case 230 is described; however, it is not limited thereto, and it may be assembled to the front case 220 in other embodiments.

The lens mounting module, the interchangeable lens system, and the electronic apparatus having the same, according to embodiments described above, may enhance the productivity of the electronic apparatus by use of the lens mounting module which may be assembled, separate from the case. Also, in the process of assembling the lens mounting module to the case, not only fabrication but also repair of the electronic apparatus may be simplified by preventing unnecessary angle control of the image pickup unit.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments unless stated otherwise. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a computer-readable media such as non-transitory magnetic storage media (e.g., magnetic tapes, hard disks, floppy disks), non-transitory optical recording media (e.g., CD-ROMs, Digital Versatile Discs (DVDs), etc.), and non-transitory solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A lens mounting module comprising:
an image pickup unit;

a mount plate that includes an installation surface on which a lens unit is installed;

a first support frame located between the image pickup unit and the mount plate, that supports the mount plate, and that includes a contact point that provides an electrical contact with the lens unit installed on the mount plate;

a second support frame installed between the first support frame and the image pickup unit, that supports the first support frame via a first combination unit protruding from the second support frame to the first support frame, and that includes an insertion space through which the image pickup unit is inserted; and a plurality of tilting control units installed in the insertion space, the plurality of tilting control units configured to adjust an angle of the image pickup unit against the second support frame via rotation of the tilting control units, wherein a back side of the second support frame is protruded further than that of the tilting control units in a rear direction along an optical axis such that the back side of the tilting control units is prevented from being exposed in a direction perpendicular to the optical axis, wherein the second support frame comprises a plurality of joining units configured to join to a case of an electronic apparatus, the case comprises a front case having an opening port receiving the lens unit and a rear case installed behind the front case, and at least one of the joining units is joined to the rear case.

2. The lens mounting module of claim 1, wherein the back side of the second support frame is protruded further than that of the image pickup unit.

3. The lens mounting module of claim 1, wherein the image pickup unit comprises an electronic shutter.

4. The lens mounting module of claim 1, wherein the contact point comprises a contact pin protruded from the first support frame toward an object and a plate spring that provides an elastic force to the contact pin.

5. The lens mounting module of claim 1, wherein the mount plate comprises a fixing unit that fixes the lens unit in an integrated configuration.

6. The lens mounting module of claim 5, wherein the fixing unit is configured in a protrusion shape in a direction crossing that of an optical axis of the lens unit.

7. The lens mounting module of claim 1, wherein the first support frame comprises a through-hole that forms a light path, and an inclined surface formed on the perimeter of the through-hole with an inclination against the direction of an optical axis of the lens unit.

8. The lens mounting module of claim 1, further comprising a plate spring installed between the mount plate and the first support frame.

9. An electronic apparatus comprising:

a lens unit;

a case having an opening port;

a lens mounting module located inside of the case and installed such that the lens unit may be mounted and dismounted; and the lens mounting module comprising:

an image pickup unit;

a mount plate that includes an installation surface on which the lens unit is installed;

a first support frame located between the image pickup unit and the mount plate, that supports the mount plate, and that includes a contact point that provides an electrical contact with the lens unit installed on the mount plate;

a second support frame installed between the first support frame and the image pickup unit, that supports the first support frame via a first combination unit protruding from the second support frame to the first support frame, and that includes an insertion space through which the image pickup unit is inserted; and a plurality of tilting control units installed in the insertion space, the plurality of tilting control units configured to adjust an angle of the image pickup unit against the second support frame via rotation of the tilting control units, wherein a back side of the second support frame is protruded further than that of the tilting control units in a rear direction along an optical axis of the lens unit such that the back side of the tilting control units is prevented from being exposed in a direction perpendicular to the optical axis, wherein the second support frame comprises a plurality of joining units configured to join to the case, the case comprises a front case having an opening port receiving the lens unit and a rear case installed behind the front case, and at least one of the joining units is joined to the rear case.

10. The electronic apparatus of claim 9, wherein the back side of the second support frame is protruded further than that of the image pickup unit.

11. The electronic apparatus of claim 9, wherein the contact point comprises a contact pin protruded from the first support frame toward an object and a plate spring that provides an elastic force to the contact pin.

12. The electronic apparatus of claim 9, wherein the first support frame comprises a through-hole forming a light path, and an inclined surface formed on the perimeter of the through-hole with an inclination against the direction of the optical axis.

* * * * *